United States Patent
Daman et al.

(10) Patent No.: US 10,732,925 B2
(45) Date of Patent: Aug. 4, 2020

(54) MULTI-DEVICE IN-VEHICLE-INFOTAINMENT SYSTEM

(71) Applicant: Nissan North America, Inc., Franklin, TN (US)

(72) Inventors: Rami Daman, West Bloomfield, MI (US); Adrian Tan, Northville, MI (US); Adam Saganski, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 195 days.

(21) Appl. No.: 15/492,594

(22) Filed: Apr. 20, 2017

(65) Prior Publication Data

US 2018/0307458 A1 Oct. 25, 2018

(51) Int. Cl.
| | | |
|---|---|---|
| G06F 3/0482 | (2013.01) | |
| G06F 3/16 | (2006.01) | |
| A63F 13/25 | (2014.01) | |
| G06F 16/638 | (2019.01) | |
| G06F 16/438 | (2019.01) | |
| H04H 20/62 | (2008.01) | |

(52) U.S. Cl.
CPC ............... *G06F 3/165* (2013.01); *A63F 13/25* (2014.09); *G06F 3/0482* (2013.01); *G06F 16/4387* (2019.01); *G06F 16/639* (2019.01); *H04H 20/62* (2013.01)

(58) Field of Classification Search
CPC .. G06F 3/165; G06F 3/0482; G06F 17/30053; G06F 17/30772
See application file for complete search history.

(56) References Cited

U.S. PATENT DOCUMENTS

| | | | | |
|---|---|---|---|---|
| 5,106,097 | A * | 4/1992 | Levine | A63F 9/183 273/237 |
| 6,707,768 | B2 * | 3/2004 | Schilling, Jr. | G11B 27/105 369/30.08 |
| 8,218,792 | B2 * | 7/2012 | Morey | H04R 5/02 381/119 |
| 8,705,763 | B2 * | 4/2014 | Kimura | G11B 27/00 381/123 |
| 9,369,101 | B2 * | 6/2016 | Qureshey | G06Q 30/0641 |
| 2004/0225519 | A1 * | 11/2004 | Martin | G11B 27/002 705/53 |
| 2005/0021470 | A1 * | 1/2005 | Martin | G11B 19/025 705/51 |
| 2010/0228740 | A1 * | 9/2010 | Cannistraro | G06F 17/30749 707/748 |
| 2011/0119626 | A1 * | 5/2011 | Faenger | G06F 3/0482 715/811 |

(Continued)

*Primary Examiner* — Dino Kujundzic
(74) *Attorney, Agent, or Firm* — Global IP Counselors, LLP (57) ABSTRACT

A multi-device in-vehicle-infotainment system is configured to playback audio files one after another using a media device shuffling operation and an audio file shuffling operation. Specifically, in response to instructions from a user interface, a controller is further configured to automatically provide a plurality of audio files, one audio file after another, to an audio output component where the controller selects the plurality of audio files randomly shuffling between a plurality of electronic media devices selecting one or more audio files from differing ones of the plurality of electronic media devices for audio playback.

19 Claims, 7 Drawing Sheets

(56) References Cited

U.S. PATENT DOCUMENTS

| | | | |
|---|---|---|---|
| 2013/0003993 A1* | 1/2013 | Michalski | H04H 20/74 381/119 |
| 2015/0169535 A1* | 6/2015 | Pusateri | G06F 17/248 715/202 |
| 2015/0355818 A1* | 12/2015 | Corbin | G06F 3/04842 715/716 |
| 2016/0034572 A1* | 2/2016 | Brown | G06F 16/61 700/94 |
| 2016/0188286 A1 | 6/2016 | Greene | |
| 2017/0249058 A1* | 8/2017 | Fisher | G06F 3/0482 |

* cited by examiner

MULTI-DEVICE IN-VEHICLE-INFOTAINMENT SYSTEM

BACKGROUND

Field of the Invention

The present invention generally relates to a multi-device in-vehicle-infotainment system. More specifically, the present invention relates to a multi-device in-vehicle-infotainment system that plays back audio files, such as music, by shuffling between media devices that store audio files.

Background Information

Media devices with a shuffling feature are known. Such media devices store audio files, such as music, and can be put into a shuffling mode such that songs (audio files) are randomly selected and played back for listening enjoyment.

SUMMARY

One object of the present disclosure is to provide a multi-device in-vehicle-infotainment system connected to a plurality of media devices, where the multi-device in-vehicle-infotainment system shuffles between a plurality of media devices (randomly selects one of the media devices), randomly selects an audio file from the randomly selected media device and plays that audio file for listening enjoyment, and after playback of the randomly selected audio file, randomly selects another one of the plurality of media devices, selecting a further file therefrom for playback.

In view of the state of the known technology, one aspect of the present disclosure is to provide a multi-device in-vehicle-infotainment system with a vehicle body structure defining a passenger compartment, a media interface component, a plurality of electronic media devices, a user interface, an audio output component and a controller. The media interface component is configured to access audio files via communications with direct electric connections, and wireless communication connections. The plurality of electronic media devices each have audio files stored therein. At least one of the electronic media devices is connected to the media interface component via one of the direct electrical connections, and at least a second one of the electronic media devices being connected to the media interface component via one of the wireless communication connections. The user interface is configured to display data representing the audio files, and receive inputs and instructions from a vehicle occupant. The audio output component is installed within the vehicle body structure and is configured to reproduce audio to the passenger compartment for listening pleasure of one or more vehicle occupants. The controller is connected to the media interface component, the user interface and the audio output component which are all located within the vehicle body structure. The controller is configured to inventory audio files stored on each of the plurality of the electronic media devices in communication with the media interface component. In response to instructions from the user interface, the controller is further configured to automatically provide a plurality of audio files, one audio file after another, to the audio output component where the controller selects the plurality of audio files randomly shuffling between the plurality of electronic media devices selecting one or more audio files from differing ones of the plurality of electronic media devices.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
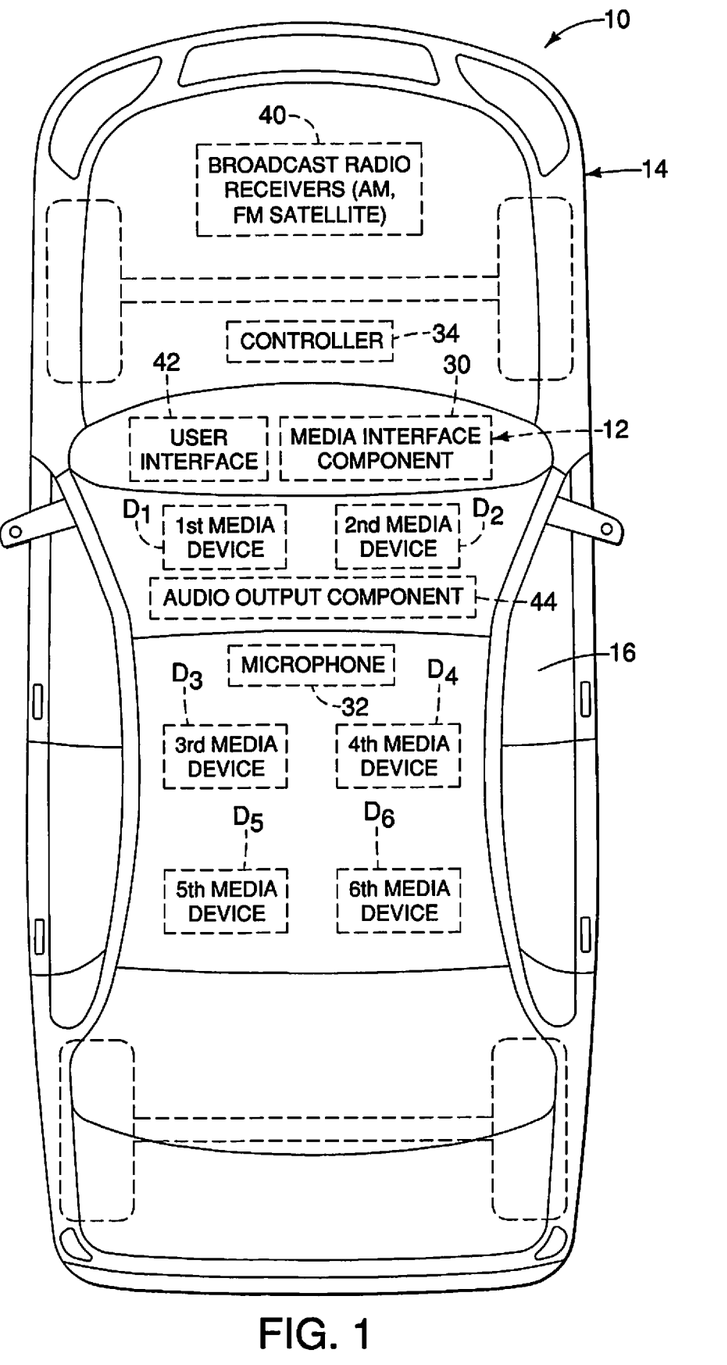
FIG. 1 is a schematic view of a vehicle that includes a multi-device in-vehicle-infotainment system in accordance with an embodiment.

Referring initially to FIG. 1, a vehicle 10 having a multi-device in-vehicle-infotainment system 12 is illustrated in accordance with a first embodiment.

The vehicle 10 is a conventional vehicle with a power plant (not shown) that can be an internal combustion engine, an electric motor or a hybrid power plant with a combination of power sources, such as an internal combustion engine and an electric motor. The vehicle 10 includes a vehicle body structure 14 that defines a passenger compartment 16 and various components of the multi-device in-vehicle-infotainment system 12, as described in greater detail below. Vehicles include conventional devices and structures and therefore further description of the vehicle 10 is omitted for the sake of brevity.

A description of the multi-device in-vehicle-infotainment system 12 is now provided with specific reference to FIGS. 1-8. The multi-device in-vehicle-infotainment system 12 is configured to operate in a multi-device shuffle mode, in response to a vehicle occupant selecting operation of the multi-device in-vehicle-infotainment system 12 in the multi-device shuffle mode. In the multi-device shuffle mode, the multi-device in-vehicle-infotainment system 12 automatically plays a plurality of audio files one audio file after another, while selecting each of the played plurality of audio files randomly by: 1) shuffling between a plurality of electronic media devices; and 2) selecting one or more audio files from each of the plurality of electronic media devices.

As used hereinbelow, the word "shuffle" means randomly selecting from a plurality of possible selections. More specifically, the word "shuffle" applies to the multi-device in-vehicle-infotainment system 12 in at least two different selection processes. As is described further below, the multi-device in-vehicle-infotainment system 12 is connectable to a plurality of audio file devices, for example, media devices $D_1$ through $D_N$. Each of the media devices $D_1$ through D stores a plurality of audio files, such as recorded music. In a first shuffling process, the word "shuffle" applies to the multi-device in-vehicle-infotainment system 12 in a process where the multi-device in-vehicle-infotainment system 12 randomly select one of the plurality of media devices $D_1$ through $D_N$. In other words, the multi-device in-vehicle-infotainment system 12 shuffles the plurality of media devices $D_1$ through $D_N$. In a second shuffling process, the multi-device in-vehicle-infotainment system 12 randomly selects an audio file from the selected one of the media devices $D_1$ through $D_N$, or put another way, the multi-device in-vehicle-infotainment system 12 shuffles the audio files on the selected one of the plurality of media devices $D_1$ through $D_1$.

The first and second shuffling processes are repeated until the multi-device in-vehicle-infotainment system 12 is either turned off, or a different operational mode is selected.

Figure 2:
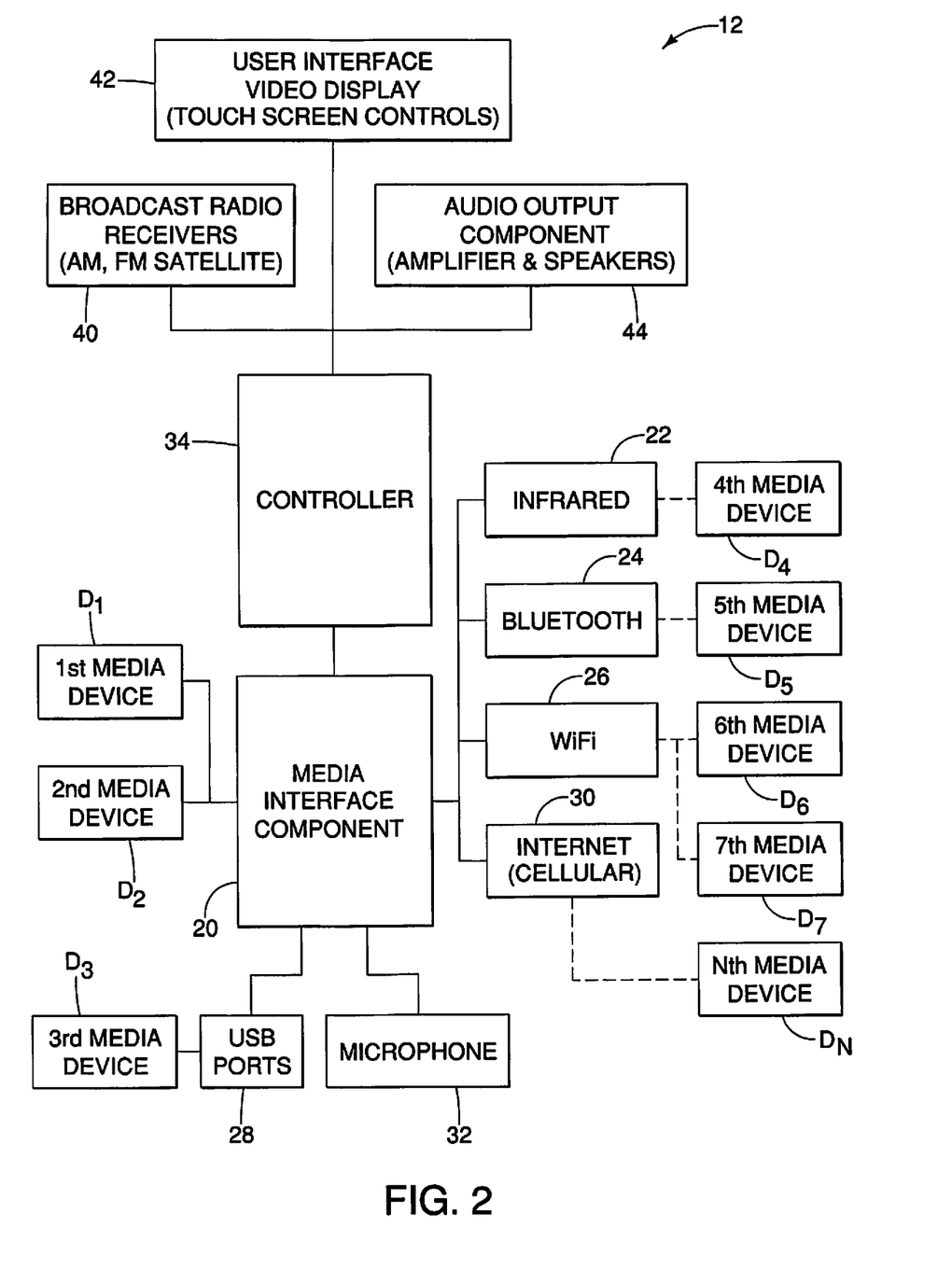
FIG. 2 is a block diagram of the multi-device in-vehicle-infotainment system that includes, among other things, a media interface component and a user interface in accordance with the embodiment.

As shown in FIGS. 1 and 2, the multi-device in-vehicle-infotainment system 12 includes a media interface component 20, various media communication devices, such as infrared device 22, a BlueTooth® device 24, a WiFi device 26, USB ports 28, Internet 30, a microphone 32 and a controller 34. Each of the infrared device, 22, the BlueTooth® device 24, the WiFi device 26, the USB ports 28, the Internet 30, the microphone 32 and the controller 34 are all directly connected to the media interface component 20.

Figure 3:
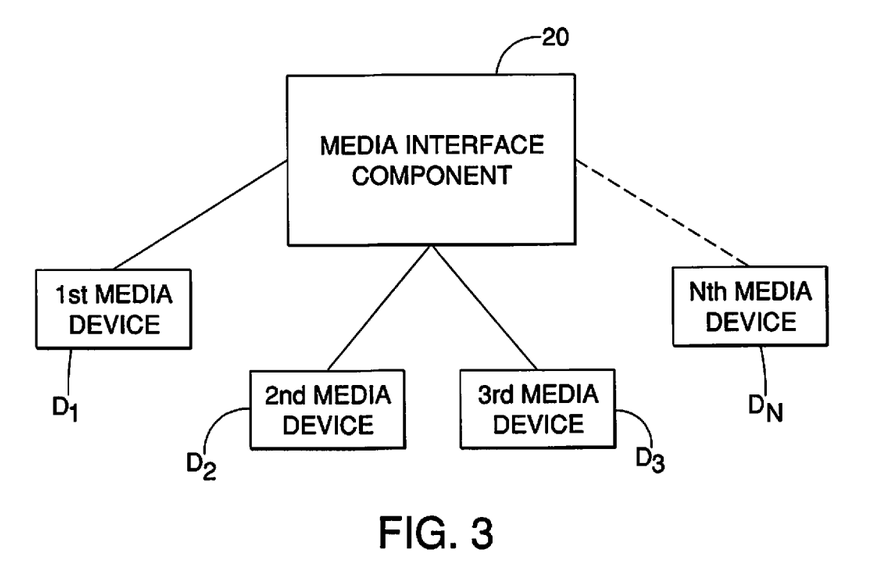
FIG. 3 is a block diagram of the media interface component of the multi-device in-vehicle-infotainment system shown connected to a plurality of media devices in accordance with the embodiments.

The media interface component 20 can be directly connected to the first media device $D_1$ and the second media device $D_2$. The first media device $D_1$ can be, for example, a CD-player or DVD-player. The second media device $D_2$ can be, for example, a digital media storage device built into the multi-device in-vehicle-infotainment system 12.

The third media device $D_3$ is connected to the media interface component 20 of the multi-device in-vehicle-infotainment system 12 via one of the USB ports 28. The third media device $D_3$ can be, for example, a mobile phone with audio file storage, a tablet device, an MP3 player and/or a personal computer. It should be understood from the drawings and the description herein that several media devices can be connected to the media interface component 20 of the multi-device in-vehicle-infotainment system 12 via others of the USB ports 28, in addition to the third media device $D_3$. In other words, the vehicle 10 and the multi-device in-vehicle-infotainment system 12 can include several USB ports 28 installed to various locations within the vehicle, each of the USB ports 28 being connected to the media interface component 20. Additional media devices (not shown) can be plugged into these USB ports 28.

The fourth media device D) can communicate wirelessly with the media interface component 20 of the multi-device in-vehicle-infotainment system 12 via the infrared device 22. Similarly, the fifth media device $D_5$ can communicate wirelessly with the media interface component 20 of the multi-device in-vehicle-infotainment system 12 via the BlueTooth® device 24. The sixth media device 1D and the seventh media device $D_7$ can communicate wirelessly with the media interface component 20 of the multi-device in-vehicle-infotainment system 12 via the WiFi device 26. The fourth media device $D_4$, the fifth media device $D_5$, the sixth media device $D_6$, the seventh media device $D_7$ can be any of the following: a mobile phone, a tablet device, and MP3 player or PC (personal computer) equipped with one or more of communication capabilities enabling these devices to communicate with the media interface component 20 via one or more of the infrared device 22, the BlueTooth® device 24, the WiFi device 26, one of the USB ports 28 or via the Internet 30 (i.e., cellular telephone communications).

Further, a plurality of further media devices up to the Nth media device $D_N$ can communicate wirelessly with the media interface component 20 of the multi-device in-vehicle-infotainment system 12 via the Internet 30 communications between media devices and the media interface component 20 can be based on cellular telephone communications and/or so-called HotSpot WiFi communications. One of the Nth media devices $D_N$ can be, for example, a personal computer or tablet located outside the vehicle 10. For example, one of the Nth media devices $D_N$ can be at a vehicle occupant's home and be linked to the media interface component 20 of the multi-device in-vehicle-infotainment system 12 so that audio files stored remotely by the Nth media device D can be searched, indexed and accessed by the media interface component 20 of the multi-device in-vehicle-infotainment system 12

It should be understood from the drawings and the description herein that multiple media devices can communicate with the media interface component 20 via each of the wireless communication devices, including the infrared device 22, the BlueTooth® device 24, the WiFi device 26 and the Internet 30.

The microphone 32 is directly connected to the media interface component 20 and the controller 34 such that voice commands spoken by a vehicle occupant can be heard and processed by the controller 34 of the multi-device in-vehicle-infotainment system 12.

The media interface component 20 is an electronic interface that receives all information, such as indexes of audio files on each of the media devices $D_1$ through $D_N$, titles of the audio files and lengths of each of the audio files on each of the media devices $D_1$ through $D_N$. This information can then be transmitted to the controller 34. The media interface component 20 is also configured to transmit commands to each of the media devices $D_1$ through $D_1$ in response to instructions from the controller 34. Such commands include requests for the information, such as indexes of audio files on each of the media devices $D_1$ through $D_N$, titles of the audio files and lengths of each of the audio files on each of the media devices $D_1$ through $D_N$, and instructions to begin playing (transmitting) a specific audio file for reproduction by the multi-device in-vehicle-infotainment system 12. Hence, the media interface component 20 is configured to access audio files via communications with direct electric connections, and wireless communication connections.

As shown in FIG. 2, the controller 34 is directly connected to the media interface component 20 and can process all of the communications between each of the media devices and the media interface component 20.

The controller 34 preferably includes a microcomputer with an audio file and playback control program that controls the multi-device in-vehicle-infotainment system 12 as discussed below. The controller 34 can also include other conventional components such as an input interface circuit, an output interface circuit, and storage devices such as a ROM (Read Only Memory) device and a RAM (Random Access Memory) device. The microcomputer of the controller 34 is programmed to control the multi-device in-vehicle-infotainment system 12. The memory circuit stores processing results and control programs such as ones for audio file indexing, audio file selection, audio file shuffling, and audio file playback operations that are run by the processor circuit. The controller 34 is operatively coupled to the multi-device in-vehicle-infotainment system 12 in a conventional manner. The internal RAM of the controller 34 stores statuses of operational flags and various control data. The internal ROM of the controller 34 stores the command instructions for various operations. The controller 34 is capable of selectively controlling any of the components of the multi-device in-vehicle-infotainment system 12 in accordance with the control program. It will be apparent to those skilled in the art from this disclosure that the precise structure and algorithms for the controller 34 can be any combination of hardware and software that will carry out the functions of the present invention.

The controller 34 is also directly connected to broadcast radio receivers 40, a user interface 42 and an audio output component 44. The broadcast radio receivers 40 can include an AM radio receiver, an FM radio receiver and a satellite radio receiver. Since the broadcast radio receivers 40 are conventional audio system components, further description is omitted for the sake of brevity.

The user interface 42 is installed in, for example, an instrument panel (not shown) at the front of the passenger compartment 16. The user interface 42 includes a video display 50 that has conventional touch screen controls such that a vehicle occupant can make audio selections or other input selections such as climate control selections.

The audio output component 44 is a conventional audio system installed within the vehicle body structure 14 that includes an audio amplifier (not shown) and speakers (not shown) installed at various locations within the passenger compartment 16 of the vehicle 10. The audio output component 44 is configured to reproduce the audio file currently selected by the vehicle occupant or the controller 34 such that vehicle occupants can listen to the audio file. More specifically, when an audio file has been selected for playback, the audio output component 44 produces the sounds that played back via instructions from the controller 34 for listening pleasure of one or more vehicle occupants. Since audio output components such as the audio output component 44 are conventional vehicle components used to reproduce audio files, further description is omitted for the sake of brevity.

It should be understood from the drawings and the description herein that the media interface component 20 and the controller 34 can be part of the same electronic circuitry housed in the same housing with in the vehicle 10. However, in the depicted embodiment, the media interface component 20 and the controller 34 are depicted and described as separate elements for the sake of simplicity.

FIG. 3 shows the media interface component 20 connected to the media devices $D_1$ through $D_N$. It should be understood from the depiction in FIG. 3 that the media interface component 20 is connected to at least the first media device $D_1$, the second media device $D_2$, the third media device D through and $N^{th}$ media device $D_N$, where the $N^{th}$ media device $D_N$ represents any of a number of further media devices such as the fourth media device $D_4$, the fifth media device $D_5$, the sixth media device $D_5$, the seventh media device $D_7$ or additional media devices (not shown). As mentioned above, the various ones of the media devices $D_1$ through $D_N$ can be any of a variety of storage and playback devices with audio files, such as a mobile phone with audio file storage, a tablet device, an MP3 player and/or a personal computer.

The multi-device in-vehicle-infotainment system 12 is configured to connect to any or all of the media devices $D_1$ through $D_N$ either via direct electronic communication, or via wireless communication. Many of the media devices $D_1$ through $D_N$ can be in the possession of a vehicle operator and may be permanently or semi-permanently connected to the media interface component 20. For example, a CD-player within the vehicle 10 is a permanent part of the multi-device in-vehicle-infotainment system 12. The vehicle operator may have a personal MP3 player plugged into the multi-device in-vehicle-infotainment system 12 via one of the USB ports. Such a connection is considered to be a semi-permanent connection to the multi-device in-vehicle-infotainment system 12. The vehicle operator may also set up a connection to his or her personal computer via a connection to the Internet 30. Specifically, the vehicle operator can use the user interface 42 to connect via the Internet 30 to a home personal computer that stores audio files. As long as an internet connection can be established by the multi-device in-vehicle-infotainment system 12 to the home personal computer via the Internet 30, the multi-device in-vehicle-infotainment system 12 can index and access the audio files on the home personal computer with the vehicle 10 in operation in a conventional manner.

Vehicle occupants other than the vehicle operator may have their own personal media device. A vehicle occupant getting into the vehicle 10 can pair his or her media device to the multi-device in-vehicle-infotainment system 12 thereby defining his or her media device as one of the media devices $D_1$ through $D_N$. Specifically, the media device of the vehicle occupant can pair their media device via communication with the BlueTooth® device 24 in a conventional manner, plug the media device into one of the USB ports 28, or connect via the WiFi device 16. The multi-device in-vehicle-infotainment system 12 can recognize, index and make the media device belonging to a vehicle occupant (other than the vehicle operator) one of the media devices $D_1$ through $D_N$.

Figure 4:
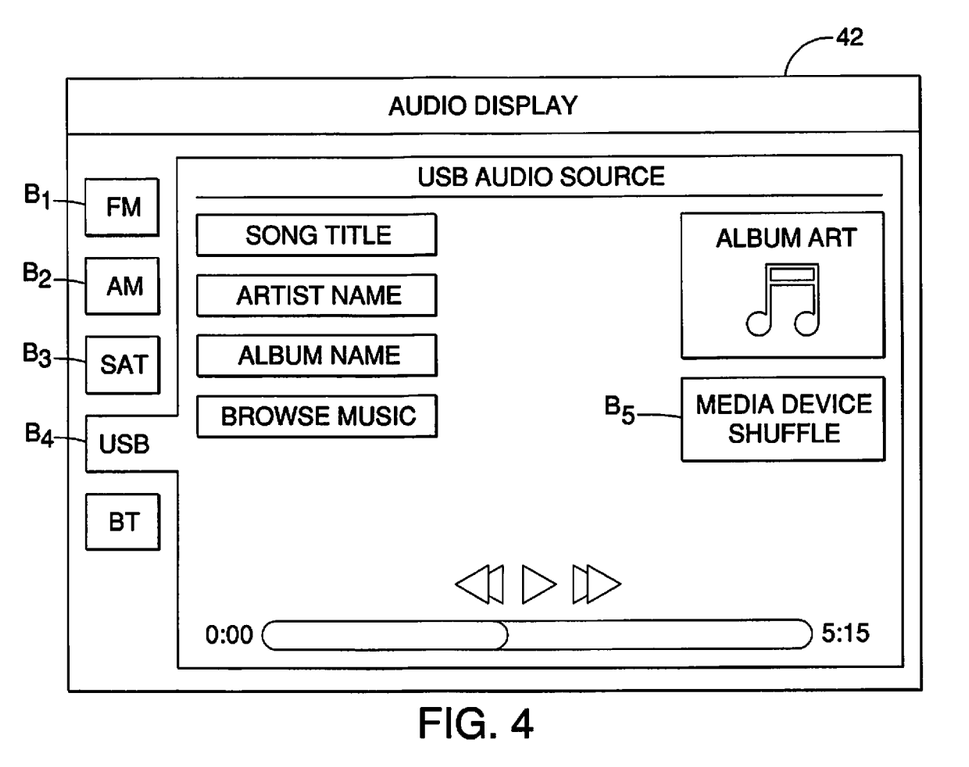
FIG. 4 is a screen shot of a display on the user interface in accordance with the embodiment.
Figure 5:
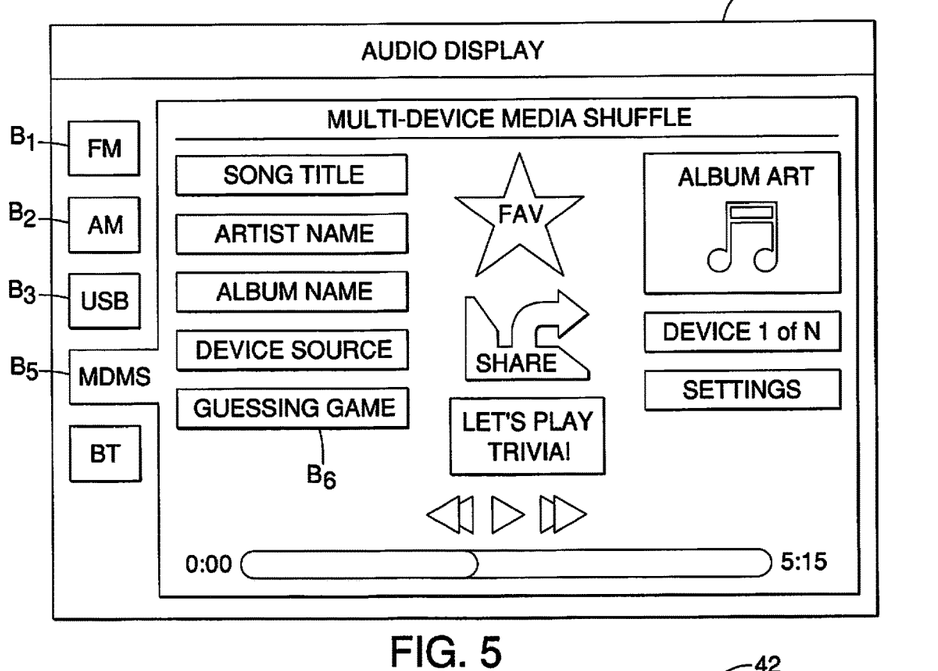
FIG. 5 is another screen shot of the display on the user interface in accordance with the embodiment.
Figure 6:
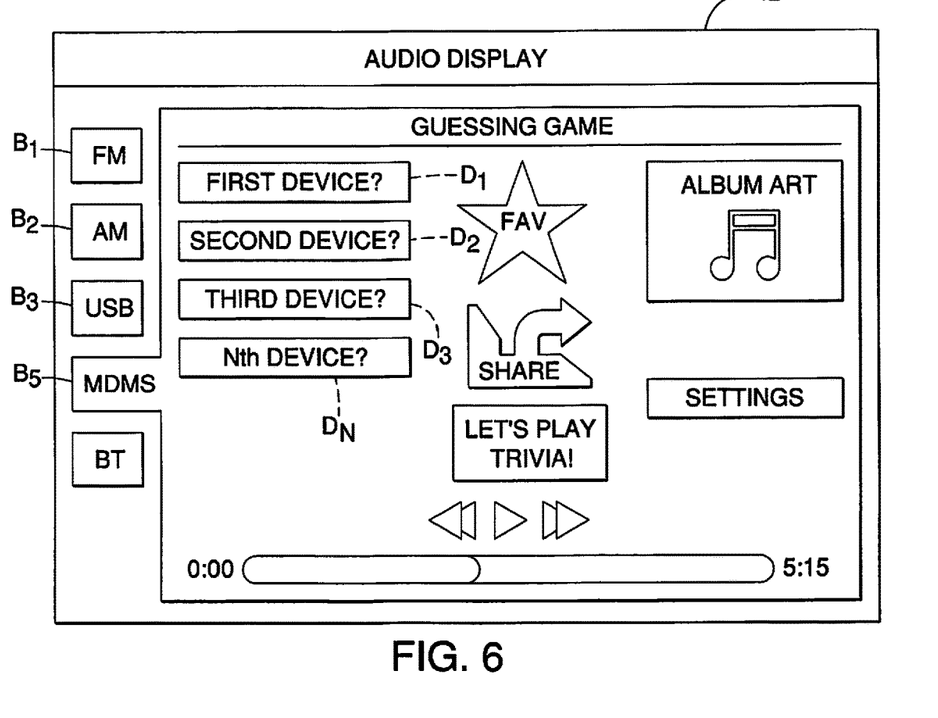
FIG. 6 is yet another screen shot of the display on the user interface in accordance with the embodiment.
Figure 7:
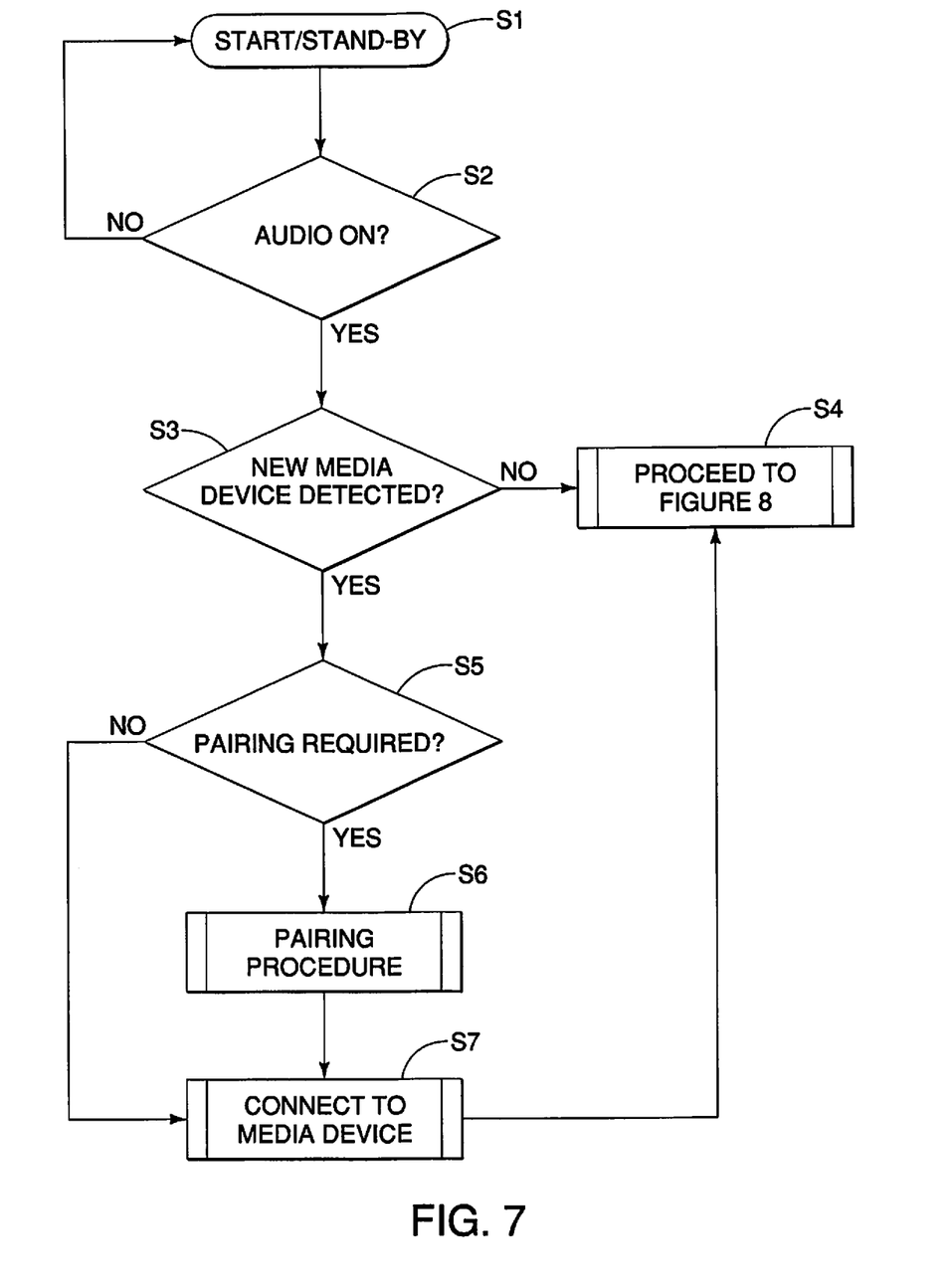
FIG. 7 is a first flowchart showing one example of logic used in the operation of the multi-device in-vehicle-infotainment system in accordance with the embodiment.
Figure 8:
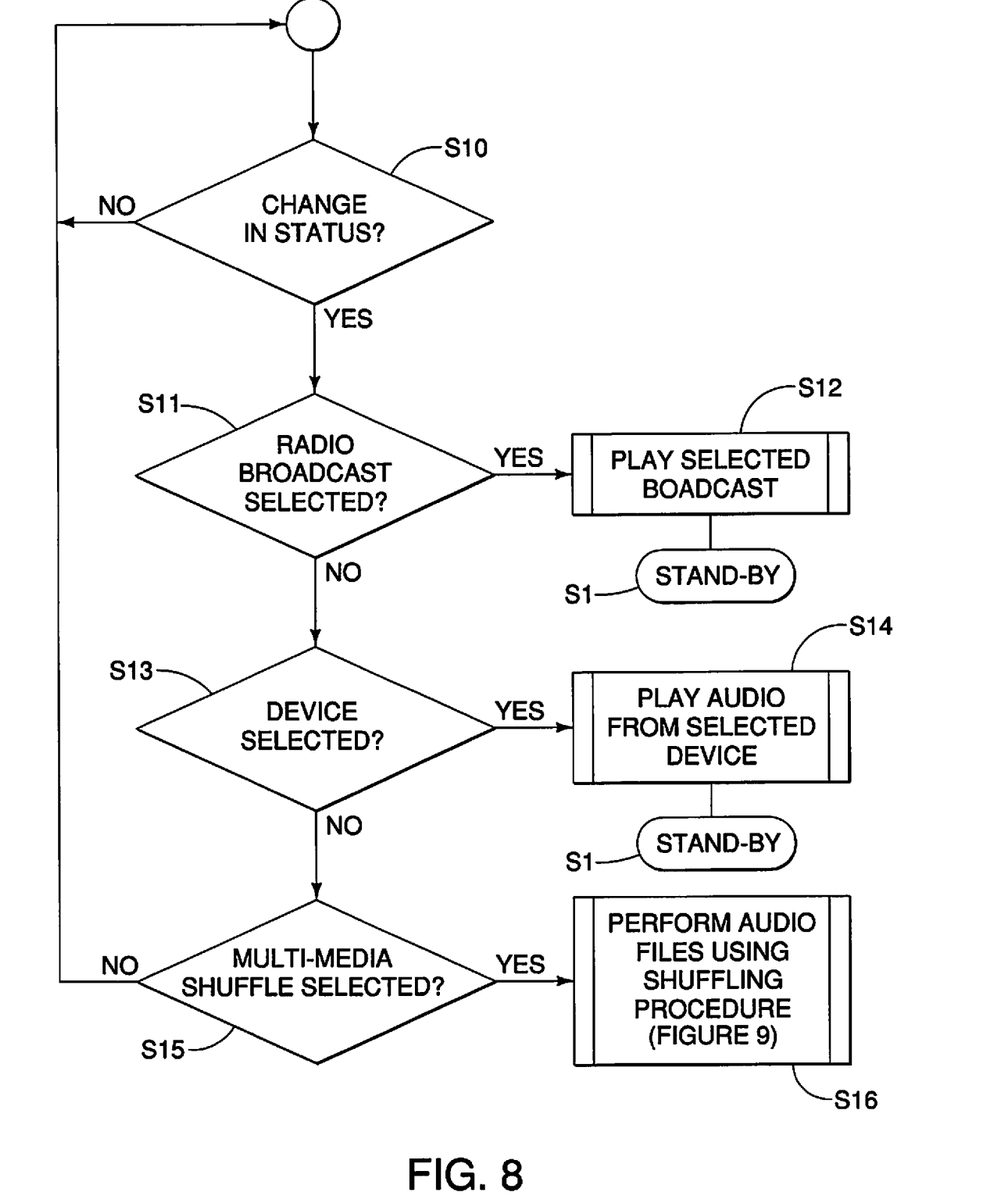
FIG. 8 is a second flowchart showing further steps of the logic used in the operation of the multi-device in-vehicle-infotainment system in accordance with the embodiment.
Figure 9:
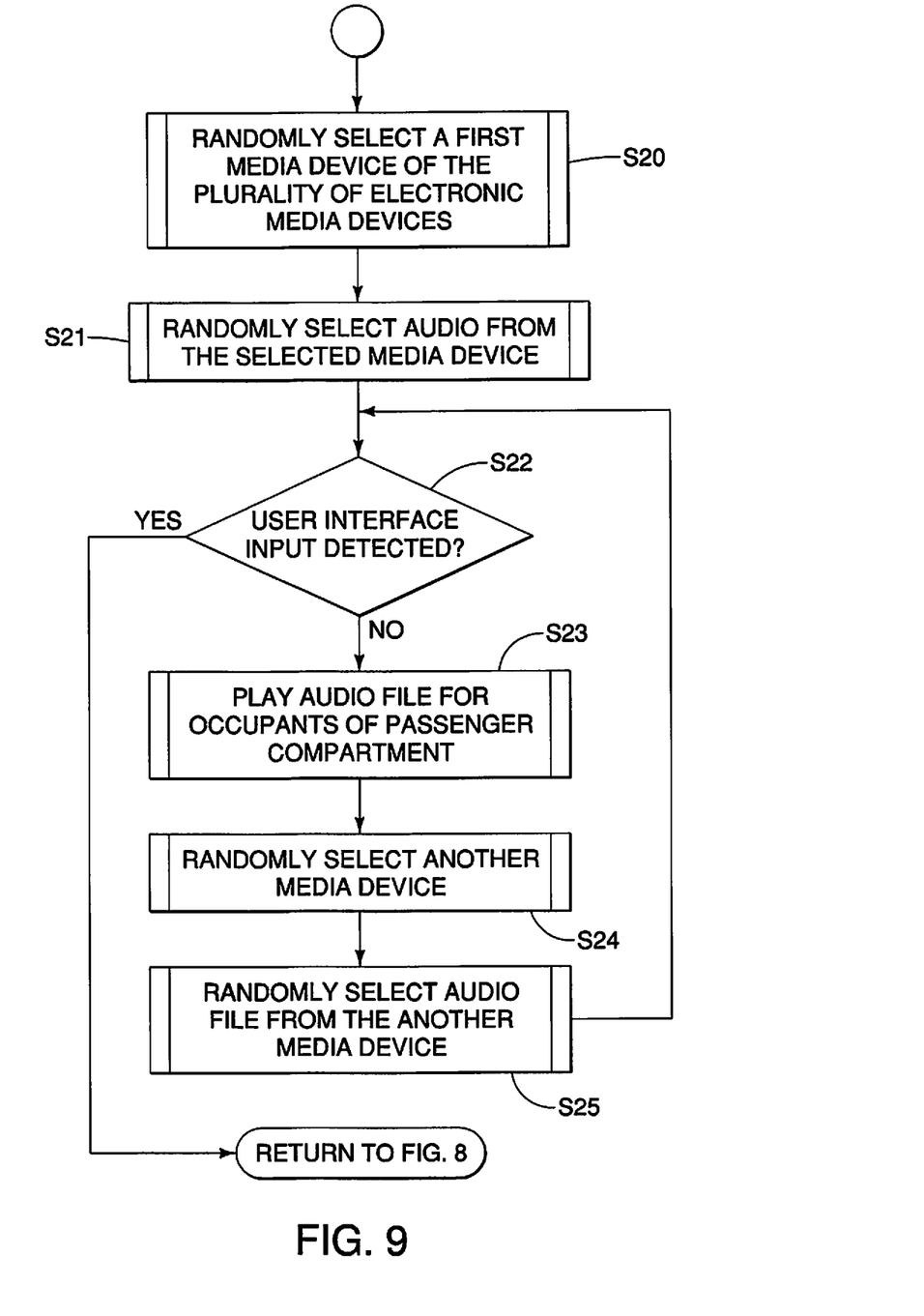
FIG. 9 is a third flowchart showing further steps of the logic used in the operation of the multi-device in-vehicle-infotainment system in accordance with the embodiment.

A description of one example of the implementation of the multi-device in-vehicle-infotainment system 12 is now provided with respect to FIGS. 4, 5 and 6 and the operational steps depicted in FIGS. 7-9. First, the multi-device in-vehicle-infotainment system 12 when operating continually monitors all of the connections to the media interface component 20. If a new media device is detected, the controller 34 goes through the operational steps set forth in FIG. 7. Thereafter, the controller 34 moves to the operational steps set forth in FIGS. 8 and 9, as described in greater detail below.

FIGS. 4, 5 and 6 show examples of selection screens shown on the display of the user interface 42. It should be understood that the depictions in FIGS. 4, 5 and 6 are basic examples of such displays and are provided as examples of the display on the user interface 42. Other different depictions of selection screens or selection menus can alternatively be displayed on the user interface 42.

As shown in FIG. 4, the user interface 42 can display a series of possible selections. In FIG. 4, a plurality of virtual buttons are displayed such that when a vehicle occupant touches the display of the user interface 42 in areas corresponding to one of the virtual buttons, the depicted selection is effected by the multi-device in-vehicle-infotainment system 12. For instance, virtual button $B_1$ corresponds to a selection of broadcasts from FM radio. When the virtual button $B_1$ is touched, the controller 34 of the multi-device in-vehicle-infotainment system 12 provides a broadcast from a selected radio station to the audio output component 44 so that the vehicle occupants can listen to a selected FM radio station.

A virtual button $B_2$ corresponds to a selection of broadcasts from AM radio. When the virtual button $B_2$ is touched, the controller 34 of the multi-device in-vehicle-infotainment system 12 provides a broadcast from a selected radio station to the audio output component 44 so that the vehicle occupants can listen to a selected AM radio station.

Further, virtual button $B_3$ corresponds to a selection of broadcasts from Satellite radio. When the virtual button $B_3$ is touched, the controller 34 of the multi-device in-vehicle-infotainment system 12 provides a broadcast from a selected radio station to the audio output component 44 so that the vehicle occupants can listen to a selected Satellite radio station.

Similarly, a virtual button $B_4$ corresponds to a selection of media devices connected to the media interface component 20 via one of the USB ports 28. When the virtual button $B_4$ is touched, the controller 34 of the multi-device in-vehicle-infotainment system 12 provides audio files from a selected media device to the audio output component 44 so that the vehicle occupants can listen to music or audio files saved on the selected media device.

Further virtual buttons (some not shown) can be provided in order to directly access media files from media devices connected to the media interface component 20 via the infrared device 22, the BlueTooth® device 24, the WiFi device 26 and/or the Internet 30. These virtual buttons to the left of the view in FIG. 4 can be scrolled through via movement of a finger touching the user interface 42, in a conventional manner.

The selections possible via the display of the user interface 42 using buttons $B_1$ through $B_4$ (and those for other manual selection of audio file playback) are referred to herein as selections corresponding to a direct user mode. In the direct user mode selections of music are provided directly from a manually selected source as selected by the vehicle occupant.

In FIG. 4, another virtual button $B_5$ is depicted on the right side of the display. The virtual button $B_5$ corresponds to a multi-device shuffle mode (MDMS mode). When the virtual button $B_5$ is touched by a vehicle occupant, the media interface component 20 enters the shuffle mode as depicted in FIG. 5 and as described below with specific reference to FIGS. 8 and 9.

As shown in FIG. 5, the display of the user interface 42 shows that the MDMS mode has been selected with the virtual button $B_5$ moved to the left side of the display. The display in FIG. 5 also includes a depiction of the title of the song currently being played (the current audio file), the name of the artist of the song, the name of the album the song came from and the device source (which media device of the media devices $D_1$ through $D_N$ is the source of the song being played).

Also shown in FIG. 5, is a virtual button $B_6$ that corresponds to a game that can be played by vehicle occupants. When the virtual button $B_6$ is selected, the display on the user interface 42 changes to that shown in FIG. 6. In FIG. 6, a guessing game is implemented where no information is provide concerning a current song being played or its source. Since the multi-device in-vehicle-infotainment system 12 is operating in the MDMS mode, the vehicle occupants have no initial idea which song is being played or its source. The vehicle occupants therefore must guess the source of the song being played once they hear it. Hence, the game is a Guessing Game. The vehicle occupants can enter their guess either by speaking the name of the media device (one of the media devices $D_1$ through $D_N$) such that the microphone receives their guess and provides their guess to the controller 34 or the vehicle occupants can touch the display of the user interface 42 at the appropriate location. It should be understood from the drawings and the description herein that if there are, for example seven different media devices connected in one way or another to the media interface component 20, all seven media devices can be depicted on the display shown in FIG. 6. It should also be understood from the drawings and the description herein, that the controller 34 is provide with voice recognition software such that the controller 34 can determine which media device was guessed by the vehicle occupants. Once a guess has been recognized, the controller 34 can then cause the button corresponding to the correct source (the correct media device) of the song playing to blink or be highlighted for a predetermined time (10-20 seconds) as an indication of success or failure in the guessing game for the vehicle occupants playing the game.

A detailed description of the operational steps conducted by the controller 34 is now provided with specific reference to FIGS. 7, 8 and 9.

In FIG. 7 at step S1, the vehicle 10 has been turned on and the multi-device in-vehicle-infotainment system 12 is able to operate but is in standby mode or is off, but no change in operation or status has been inputted by a vehicle passenger via the user interface 42. The multi-device in-vehicle-infotainment system 12 continuously monitors the user interface 42 for changes in the overall status of its own operation, selection of mode of operation and/or source of audio files to be played for the enjoyment of vehicle occupants.

Next at step S2, the controller 34 determines whether or not the multi-device in-vehicle-infotainment system 12 has been turned on, or if already on, a selection has been inputted by one of the vehicle occupants or a media device has been installed or its status changed. If there has been no change in status, then operation returns to the standby mode in step S1. If there in a change in status, then operation moves to step S3. At step S3, the controller 34 determines whether or not a new media device is present within the vehicle 10, either physically present and detected by the BlueTooth® device 24, the infrared device 22 or the WiFi device 26, or made apparent via input by a vehicle occupant using the user interface 42 to connect to a media device over the internet 30, or has been plugged into one of the USB ports 28. If the new media device has been detected, for example, the media device has been plugged into one of the USB ports 28, the new media device is connected to the controller 34 and assigned a media device name and/or media device number/

If the controller 34 fails to detects the presence of a new media device at step S3, the controller 34 then moves to step S4. At step S4, operation proceeds to the steps depicted in FIG. 8. If the controller 34 detects the presence of a new media device at step S3, the controller 34 then moves to step S5. At step S5, the controller 34 determines whether or not the new media device needs to be paired. For example, when a device is detected via the BlueTooth® device 24, or WiFi pairing is required. If pairing is required, the controller 34 moves to step S6. At step S6, the controller 34 pairs with the new media device. Since pairing procedures are well known, further description of pairing is omitted for the sake of brevity. After pairing, the controller 34 moves to step S7

At step S5 if the controller 34 determines that pairing is not required, operation moves to step S7. At step S7, the newly detected media device is defined as being one of the plurality of media devices $D_1$ through $D_N$, and/or can be labeled with a name, such as the name of the media device as defined by its owner.

Next, operation moves to step S4, where operation proceeds to the steps depicted in FIG. 8.

In step S10, the controller 34 determined whether or not there has been any change in the status of operation of the multi-device in-vehicle-infotainment system 12, such as being turned on, or if a specific audio selection has been made by a vehicle occupant. If the multi-device in-vehicle-infotainment system 12 is not on or has just been turned off, or if no selection has been made, operation moves to step S15, described below. At step S10, if audio is on and a selection has been inputted by a vehicle occupant, then operation moves to step S11.

At step S11, the controller 34 determines whether or not a radio station has been selected, for example, an AM radio station, an FM radio station or a Satellite radio station. If so, then operation moves to step S12 where the broadcast of the selected radio station is fed to the audio output component 44 such that the audio broadcast is made audible via the speakers of the audio output component 44. Thereafter, operation returns to standby mode (step S1) where the controller 34 continues monitoring for any changes in status of operation of the multi-device in-vehicle-infotainment system 12.

In step S11, if the controller determines that there has been no radio selection made, operation then moves to step S13. In step S13, the controller 34 determines whether or not one of the vehicle occupants has used the user interface 42 to select audio from a specific one of the media devices $D_1$ through $D_N$ connected to the multi-device in-vehicle-infotainment system 12. If so, operation moves to step S14 where the selected audio from the selected media device is played over the speakers of the audio output component 44. Thereafter, operation returns to standby mode (step S1) where the controller 34 continues monitoring for any changes in status of operation of the multi-device in-vehicle-infotainment system 12.

At step S13, if the controller 34 determines the vehicle occupant has not selected one of the media devices $D_1$ through $D_N$, then operation moves to step S15. At step S15, the controller 34 determines whether or not one of the vehicle occupants has used the user interface 42 to select the multi-media shuffle mode. If not, operation returns to the top of the flow chart in FIG. 8, or the controller can returns to standby mode (step S1). If the multi-media shuffle mode has been selected, operation then moves to step S16 and the steps depicted in FIG. 9.

In FIG. 9, as step S20, the controller 34 randomly selects one of the connected media devices $D_1$ through $D_N$. Repeated subsequent iterations of the flowchart in FIG. 9 repeat this step thereby defining a shuffling of the media devices. At step S21, an audio file is randomly selected from the audio files stored on the media device selected in step S20. At step S22, the controller 34 checks to see if there is any activity related to inputs or changes in audio selections using the user interface 42. If an input, a change in status, or audio selection has been made that supersedes the shuffling process, then operation returns to FIG. 8. If the controller 34 determines at step S22 that there has been no input, no change in status, and no further audio selection has been made, then operation moves to Step S23.

In step S23, the audio file randomly selected in step S21 from the media device randomly selected in step S20 is played back using speakers of the audio output component 44. Prior to the completion of the playback of the audio file produced in Step 23, the controller 34 conducts the operation in step S24. At step S24, another media device of the media devices $D_1$ through $D_N$ is randomly selected. At step S25, an audio file stored in the media device selected in Step S24 is put into a que and once the playback of the previously selected audio file has finished, the newly selected audio file is played.

The shuffling process exemplified in the steps depicted in FIG. 9 can include some rules and organization. For example, the operation of selecting a media device shown in step S24 (and/or step S20) can be restricted by limiting each subsequent selection of a media device to a device that has not yet been recently selected, until after each of the media devices $D_1$ through $D_N$ has been selected at least once. However, this rule is not required, but is one possible rule that ensures a wide selection of audio files played back with few, if any, repeated playbacks. In other words, with the optional rule, each of the media devices $D_1$ through $D_N$ is selected once before a repeat of selection of one of the media device. Thereafter, the process continues again until each of the media devices is again selected in a random order. It is also possible to organize the selection process such that each time step S24 (and/or step S20) is performed, the randomly selected media device is selected from all of the media devices $D_1$ through DD. It should be understood that in a shuffling operation, various rules can be applied.

Similarly, the operation of selecting an audio file shown in step S25 (and/or step S21) can be restricted by limiting each subsequent selection of an audio file that has not been previously selected within a predetermined amount of time, or with a predetermined number of vehicle operation cycles. In other words, each audio file(s) recently played can be prevented form selection and are excluded from the current random selection process for at least a pre-determined number of vehicle operation cycles, where one vehicle operation cycle corresponds to an engine of the vehicle being started and then shut off once.

The controller 34 is also configured to receive inputted selections that further limit the shuffling process. The inputted selections can become meta data that are associated with the audio files. The controller is configured to recognize meta data and sort the audio files according to the meta data. For example, shuffling of audio files can be further limited by specified artists, selected genres of music, length of audio file, or any of a variety of features of the audio files, such as whether or not the audio file includes only spoken word related audio files, or music related audio files. Another type of meta data is a favorite designation. These audio files are preferred by users of the electronic media devices. The controller can use this favorite designation to identify a list of favorite audio files from each electronic media device. These favorite audio file lists can be shuffled separately if desired.

In the multi-device shuffle mode, the multi-device in-vehicle-infotainment system 12 automatically plays a plurality of audio files one audio file after another, while selecting each of the played plurality of audio files randomly by: 1) shuffling between the plurality of electronic media devices (media devices $D_1$ through $D_N$); and 2) selecting one or more audio files from the selected one of the plurality of electronic media devices (media devices $D_1$ through $D_N$).

In the above described example of logic used to conduct the media device shuffling and the audio file selection of the media devices, all of the audio files (for example, music MP3 files) any of a variety of shuffling techniques can be used. For instance, the above rules can be applied to the media device and audio file selection processes. Alternatively, in a separate embodiment, no rules can be applied except that each time either step S20 and S24 is conducted, one of the media devices is randomly selected. Similarly, in a separate embodiment, no rules can be applied except that each time either step S21 and S25 is conducted, the audio file or audio files selected from the selected media devices are randomly selected.

Further in the above described embodiment of the invention, only audio files from the above described media devices $D_1$ through $D_1$ are utilized as sources for audio files. In other words, in the shuffling processes described herein, the broadcast radio receivers 40 are not used as a source for audio files because of the unpredictable starting times of audio files broadcast over the broadcast radio receivers 40.

Rather, all audio files are randomly accessed for shuffling from only the plurality of electronic media devices $D_1$ through $D_N$. The plurality of media devices $D_1$ through $D_N$ can include, for example, any of a CD player, a DVD player, handheld mobile devices such as mobile phones, tablets or MP3 players, a digital recorder, a USP memory chip and a personal computing device. Several of these media devices, such as the CD player and the DVD player can be permanently wired to the media interface component 20 defining direct electrical connections. Some media devices can be temporarily connected to the media interface component 20 via, for example, a USB port, or other electronic device plug in interface. The remaining media devices are connected to the media interface component via one of the wireless communication connections (the infrared device 22, the BlueTooth® device 24, the WiFi device 26 and/or the Internet 30).

It should be understood from the above description that the user interface 42 (via the controller 34) is configured to display data representing a list, lists or index of each of the audio files on each of the connected media devices. The controller 34 is configured to receive inputs and instructions from a vehicle occupant via the user interface 42.

In response to instructions from the user interface 43, the controller 34 is further configured to automatically provide a plurality of audio files, one audio file after another, to the audio output component 44 where the controller 34 selects the plurality of audio files randomly shuffling between the plurality of electronic media devices selecting one or more audio files from differing ones of the plurality of electronic media devices.

The controller 34 is further configured to play a game that includes identifying which one of the plurality of electronic media devices $D_1$ through $D_N$ is the source of a current audio file being provided by the audio output component 44 to the passenger compartment 14, and further configured to operate the user interface 42 to display a question to vehicle occupants asking which of the plurality of electronic media devices $D_1$ through $D_N$ is the source of the current audio file.

Further, as described above, when a new media device is either present within the vehicle 10 or has been electronically connected to the media interface component 20, the controller 34 can effect a pairing or other communication connection with the new media device and provide that new media device with a name. The controller 34 can further create or download from the media device a list, a table or an index of each of the audio files stored on that media device. The controller 34 is configured is further configured such that in response to one of the wireless communication connections detecting a new one of the electronic media devices being present within the passenger compartment, the controller 34 conducts a login procedure that includes identification of the new one of the electronic media devices, performs an inventory of audio files stored on each of the new one of the electronic media devices and designating an identification label corresponding to the new one of the electronic media devices.

The various vehicle body structures are conventional components that are well known in the art. Since vehicle body structures are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment the following directional terms "forward", "rearward", "above", "downward", "vertical", "horizontal", "below" and "transverse" as well as any other similar directional terms refer to those directions of a vehicle equipped with the multi-device in-vehicle-infotainment system. Accordingly, these terms, as utilized to describe the present invention should be interpreted relative to a vehicle equipped with the multi-device in-vehicle-infotainment system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A multi-device in-vehicle-infotainment system, comprising:

a vehicle body structure of a vehicle defining a passenger compartment;

a media interface component located within the vehicle and configured to access audio files via communications with broadcast radio receivers including at least one of an FM radio receiver and a satellite radio receiver, direct electric connections including at least one of a USB port, direct wiring to the media interface component and a disc player, and wireless communication connections including at least one of a WiFi connection and a Bluetooth connection;

a plurality of electronic media devices located within the vehicle, with one of the plurality of electronic media devices being a device storing audio recordings connected via one of the at least one of the USB port, direct wiring and the disc player, the WiFi connection or the Bluetooth connection, the one of the plurality of electronic media devices being at least one of the following: an audio file player, a tablet device, a mobile phone or a personal computing device within the vehicle, another of the plurality of electronic media devices being connected to the media interface via one of the WiFi connection or the Bluetooth connection, with the another of the plurality of electronic media devices being at least one of the following: an audio file player a tablet device, a mobile phone or a personal computing device within the vehicle, each of the one and the another of plurality of electronic media devices having audio files stored therein;

a user interface located within the vehicle and configured to display data representing the audio files and any lists of audio files stored on any of the plurality electronic media devices, and receive inputs and instructions from a vehicle occupant;

an audio output component installed within the vehicle and configured to reproduce audio to the passenger compartment for listening pleasure of one or more vehicle occupants; and a controller connected to the media interface component, the user interface and the audio output component which are all located within the vehicle body structure, the controller being configured to inventory audio files stored on each of the plurality of the electronic media devices in communication with the media interface component, and in response to instructions from the user interface, the controller is further configured to automatically provide a plurality of audio files, one audio file after another, to the audio output component selected from each of the plurality of electronic media devices connected to any of the broadcast radio receivers, direct electric connections, and wireless communication connections, where the controller selects the plurality of audio files randomly shuffling between each of the plurality of electronic media devices selecting one or more audio files from differing ones of the plurality of electronic media devices such that the controller randomly selects of one of the plurality of electronic media devices and one of the plurality of audio files therefrom, the controller further being configured to play a game that includes identifying which one of the plurality of electronic media devices is the source of a current audio file being provided by the audio output component to the passenger compartment, and being further configured to operate the user interface or the plurality of electronic media devices to display a question to vehicle occupants asking which of the plurality of electronic media devices is the source of the current audio file.

2. The multi-device in-vehicle-infotainment system according to claim 1, wherein the one of the electronic media devices is identified by the controller with a first identification label and the another of the electronic media devices is designated by the controller with a second identification label different from the first identification label.

3. The multi-device in-vehicle-infotainment system according to claim 1, wherein the user interface includes a plurality of input selections such that the vehicle occupant selects one of the plurality of input selections as the instruction to the controller, and in response to selecting the one of the plurality of input selections, the selected one provides audio content to the audio output component for listening pleasure of one or more vehicle occupants, the plurality of input selections including:

audio only from one of the broadcast radio receivers, including AM broadcasts, FM broadcasts and Satellite radio broadcasts;

audio from one of the plurality of electronic media devices; and audio only from the plurality of audio files automatically provided by the controller where the controller selects the plurality of audio files randomly shuffling between the plurality of electronic media devices selecting one or more audio files from differing ones of the plurality of electronic media devices.

4. The multi-device in-vehicle-infotainment system according to claim 1, wherein the broadcast radio receivers that the media interface component communicates with further includes an AM radio receiver.

5. The multi-device in-vehicle-infotainment system according to claim 1, wherein the wireless communication connections that the media interface component communicates with includes a plurality of WiFi ports and an infrared connection.

6. The multi-device in-vehicle-infotainment system according to claim 1, wherein the plurality of electronic media devices includes one or more of the following: a CD-player, a DVD player, a digital recorder, an MP3 player and a USB memory chip.

7. The multi-device in-vehicle-infotainment system according to claim 1, wherein the controller is configured such that in response to one of the wireless communication connections detecting a new one of the electronic media devices being present within the passenger compartment, the controller conducts a login procedure that includes identification of the new one of the electronic media devices, performing an inventory of audio files stored on each of the new one of the electronic media devices and designating an identification label corresponding to the new one of the electronic media devices.

8. The multi-device in-vehicle-infotainment system according to claim 1, wherein
the controller is further configured to automatically provide a plurality of audio files, one audio file after another, to the audio output component from each of the plurality of electronic media devices connected to any of the broadcast radio receivers, direct electric connections, and wireless communication connections, where the controller selects the plurality of audio files randomly shuffling between the plurality of electronic media devices selecting one or more audio files from any list or lists of audio files stored on any differing ones of the plurality of electronic media devices.

9. The multi-device in-vehicle-infotainment system according to claim 1, wherein
the controller is configured to connect an additional one of the plurality of electronic media devices to the media interface component via one of the wireless communication connections, the additional one of the electronic media having audio files stored therein, the controller being further configured to select audio files from the additional one of the plurality of electronic media devices for shuffling.

10. The multi-device in-vehicle-infotainment system according to claim 9, wherein
the additional one of the electronic media devices being a mobile phone of a vehicle occupant other than a vehicle operator.

11. The multi-device in-vehicle-infotainment system according to claim 10, wherein
the controller being configured to disconnect from the additional one of the electronic media devices when the vehicle occupant leaves the vehicle with the mobile phone of the vehicle occupant.

12. A method for shuffling audio files of multi-device in-vehicle-infotainment system, comprising:
providing a media interface component configured to access audio files via communications with broadcast radio receivers, direct electric connections, and wireless communication connections within a vehicle;
connecting a plurality of electronic media devices to the media interface, each of the electronic media devices having audio files stored therein, at least one of the electronic media devices being connected to the media interface component via one of the wireless communication connections, and another of the electronic media devices being connected to the media interface component via one of the wireless communication connections or one of the direct electric connections;
providing a user interface configured to display data representing the audio files, and receive inputs and instructions from a vehicle occupant;
providing an audio output component installed within the vehicle and configured to reproduce audio to a passenger compartment of the vehicle for listening pleasure of one or more vehicle occupants;
providing a controller connected to the media interface component, the user interface and the audio output component, the controller inventorying audio files stored on each of the plurality of the electronic media devices in communication with the media interface component, providing a plurality of audio files, one audio file after another, to the audio output component where the controller selects the plurality of audio files by randomly shuffling between the plurality of electronic media devices and selects one or more audio files from differing ones of the plurality of electronic media devices; and
the controller being configured to play a game that includes asking vehicle occupants to identify which one of the plurality of electronic media devices is the source of a current audio file being provided by the audio output component to the passenger compartment, the playing of the game including receiving an input via one of the user interface, the plurality of electronic media devices and a microphone from one of the vehicle occupants, and
determining whether or not the input represents a correct identification of which one of the plurality of electronic media devices is the source of the current audio file.

13. The method for shuffling audio files according to claim 12, wherein
connecting an additional one of the electronic media devices to the media interface component via one of the direct electrical connections and identifying the additional one of the electronic media devices with a first identification label and
connecting an additional second one of the electronic media devices to the media interface component via one of the wireless communication connections and designating the additional second one of the electronic media devices with a second identification label different from the first identification label.

14. The method for shuffling audio files according to claim 13, wherein
detecting a new one of the electronic media devices being present within the vehicle and conducting a login procedure that includes identification of the new one of the electronic media devices, performing an inventory of audio files stored on each of the new one of the electronic media devices and designating an identification label corresponding to the new one of the electronic media devices.

15. The method for shuffling audio files according to claim 12, wherein
the randomly shuffling between the plurality of electronic media devices includes the use of the new one of the electronic media devices, and
the playing of the game includes the use of the new one of the electronic media devices.

16. A multi-device in-vehicle-infotainment system, comprising:
a vehicle body structure of a vehicle defining a passenger compartment;
a media interface component located within the vehicle and configured to access audio files via communications with broadcast radio receivers including at least one of an FM radio receiver and a satellite radio receiver, direct electric connections including at least one of a USB port, direct wiring to the media body structure and a disc player, and wireless communication connections including a WiFi connection and a Bluetooth connection;
a plurality of electronic media devices located within the vehicle, with at least one of the plurality of electronic media devices being a device storing a list of favorite audio files, the one of the plurality of electronic media devices being connected to the media interface via one of the at least one USB port, direct wiring, the WiFi connection and the Bluetooth connection, the one of the plurality of electronic media devices being at least one of the following: an audio file player, a tablet device, a mobile phone or a personal computing device within the vehicle, another of the plurality of electronic media devices storing another list of favorite audio files and being connected to the media interface via one of the WiFi connection or the Bluetooth connection, with the another of the plurality of electronic media devices being at least one of the following: an audio file player, a tablet device, a mobile phone and a personal computing device;

a user interface located within the vehicle and configured to display data representing audio files, the list of favorite audio files and the another list of favorite audio files, and receive inputs and instructions from a vehicle occupant;

an audio output component installed within the vehicle and configured to reproduce audio to the passenger compartment for listening pleasure of one or more vehicle occupants; and a controller connected to the media interface component, the user interface and the audio output component which are all located within the vehicle body structure, the controller being configured to inventory the list of favorite audio files, the another list of favorite audio files stored on the plurality of the electronic media devices in communication with the media interface component, and in response to instructions from the user interface, the controller is further configured to automatically provide a favorite audio file to the audio output component, one audio file after another, selected from the list of favorite audio files, the another list of favorite audio files and any further lists of favorite audio files from any of the plurality of electronic media devices, the controller selecting the favorite audio file by randomly shuffling between the list of favorite audio files, the another list of audio files and the any further lists of favorite audio files of the plurality of electronic media devices.

17. The multi-device in-vehicle-infotainment system according to claim 16, wherein the controller is configured to connect an additional one of the electronic media devices to the media interface component via one of the wireless communication connections, the additional one of the electronic media having an additional list of favorite audio files, the controller being further configured to select the favorite audio file by randomly shuffling between the list of favorite audio files, the another list of audio files, the additional one of the electronic media devices and the any further lists of favorite audio files of the plurality of electronic media devices.

18. The method for shuffling audio files according to claim 17, wherein the additional one of the electronic media devices being a mobile phone of a vehicle occupant other than a vehicle operator.

19. The method for shuffling audio files according to claim 18, wherein the controller being configured to disconnect from the additional one of the electronic media devices when the vehicle occupant leaves the vehicle with the mobile phone of the vehicle occupant.

* * * * *